US012572128B2

(12) United States Patent
Oikawa

(10) Patent No.: US 12,572,128 B2
(45) Date of Patent: Mar. 10, 2026

(54) MACHINE TOOL CONTROL DEVICE

(71) Applicant: FANUC CORPORATION, Yamanashi (JP)

(72) Inventor: Kouki Oikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 406 days.

(21) Appl. No.: 18/044,029

(22) PCT Filed: Sep. 27, 2021

(86) PCT No.: PCT/JP2021/035332
§ 371 (c)(1),
(2) Date: Mar. 3, 2023

(87) PCT Pub. No.: WO2022/071209
PCT Pub. Date: Apr. 7, 2022

(65) Prior Publication Data
US 2024/0012386 A1      Jan. 11, 2024

(30) Foreign Application Priority Data
Oct. 2, 2020     (JP) ................................. 2020-167531

(51) Int. Cl.
*G05B 19/4093*          (2006.01)
*G05B 19/37*            (2006.01)
(52) U.S. Cl.
CPC ..... *G05B 19/40938* (2013.01); *G05B 19/378* (2013.01)
(58) Field of Classification Search
CPC ............ G05B 19/40938; G05B 19/378; G05B 2219/41256; G05B 19/404; B23Q 15/12
See application file for complete search history.

(56) References Cited

U.S. PATENT DOCUMENTS

2012/0109360 A1*   5/2012   Nishimura ......... B23Q 11/0039
                                                          700/180
2013/0345851 A1*  12/2013   Kataoka ............... G05B 19/404
                                                          700/174

(Continued)

FOREIGN PATENT DOCUMENTS

| JP | 2012-091283 A | 5/2012 |
|----|----|----|
| JP | 5727572 B2 | 6/2015 |
| JP | 2020-069621 A | 5/2020 |

OTHER PUBLICATIONS

International Search Report issued in PCT/JP2021/035332; mailed Nov. 30, 2021.

*Primary Examiner* — Kamini S Shah
*Assistant Examiner* — Mohammed Shafayet
(74) *Attorney, Agent, or Firm* — Studebaker Brackett PLLC

(57)                    ABSTRACT
The present invention provides a machine tool control device that makes it possible to optimally adjust a variation condition and obtain a stable chattering suppression effect. The machine tool control device is provided with: a variation command calculation unit that calculates a variation command on the basis of a speed command for a spindle motor in a machine tool and a variation condition for varying the rotation speed of the spindle motor, and generates a speed control command for controlling the speed of the spindle motor on the basis of the speed command and the variation command; a speed deviation determination unit that determines whether or not a speed deviation indicating the difference between the speed command and the actual speed of the spindle motor in a prescribed period is within a first permissible range; and a condition change unit that changes the variation condition when the speed deviation is out of the first permissible range.

7 Claims, 5 Drawing Sheets

(56) References Cited

U.S. PATENT DOCUMENTS

| | | | |
|---|---|---|---|
| 2015/0102756 A1* | 4/2015 | Okita | H02P 29/02 |
| | | | 318/473 |
| 2015/0168938 A1* | 6/2015 | Fujimoto | G05B 19/4163 |
| | | | 700/160 |
| 2017/0277160 A1* | 9/2017 | Morita | G05B 19/29 |
| 2018/0281139 A1* | 10/2018 | Yamamoto | B23B 13/08 |

* cited by examiner

FLUCTUATION AMPLITUDE
 = SPEED COMMAND × (FLUCTUATION AMPLITUDE RATE / 100)

FLUCTUATION FREQUENCY
 = (SPEED COMMAND / 60) × FLUCTUATION AMPLITUDE RATE / 100)

MACHINE TOOL CONTROL DEVICE

TECHNICAL FIELD

The present invention relates to a machine tool control device.

BACKGROUND ART

There is a known technique to suppress self-excited chatter vibration of regeneration type that occurs during a cutting process performed by a machine tool, by causing a spindle speed of the machine tool to fluctuate cyclically (for example, see Patent Document 1).

When chatter vibration occurs, the machine tool disclosed in Patent Document 1 changes a predetermined parameter to thereby change at least one of an average rotation speed, an amplitude, or a cycle of a rotary shaft of the machine tool.

Patent Document 1: Japanese Unexamined Patent Application, Publication No. 2012-91283

DISCLOSURE OF THE INVENTION

Problems to be Solved by the Invention

In the case of a machine tool of the above-mentioned type, in order to achieve a stable effect of suppressing chatter, it is necessary to appropriately adjust fluctuation conditions at the time of causing a speed of a spindle motor to fluctuate. However, setting the fluctuation conditions is complicated, making it difficult to adjust the fluctuation conditions at a machining site. Therefore, there is a demand for a machine tool control device capable of optimally adjusting the fluctuation conditions and achieving a stable effect of suppressing chatter.

Means for Solving the Problems

A machine tool control device according to the present disclosure includes: a fluctuation command calculation unit configured to calculate a fluctuation command, based on a speed command for a spindle motor of a machine tool and fluctuation conditions for causing a rotation speed of the spindle motor to fluctuate, and generate a speed control command for controlling a speed of the spindle motor, based on the speed command and the fluctuation command; a speed deviation determination unit configured to determine whether or not a speed deviation indicating a difference between the speed command and an actual speed of the spindle motor within a predetermined period of time is within a first permissible range; and a condition change unit configured to change the fluctuation conditions in a case where the speed deviation is outside the first permissible range.

A machine tool control device according to the present disclosure includes: a fluctuation command calculation unit configured to calculate a fluctuation command, based on a speed command for a spindle motor of a machine tool and fluctuation conditions for causing a rotation speed of the spindle motor to fluctuate, and generate a speed control command for controlling a speed of the spindle motor, based on the speed command and the fluctuation command; a torque command determination unit configured to determine whether or not a torque command for the spindle motor within a predetermined period of time is within a second permissible range; and a condition change unit configured to change the fluctuation conditions in a case where the torque command is outside the second permissible range.

A machine tool control device according to the present disclosure includes: a fluctuation command calculation unit configured to calculate a fluctuation command, based on a speed command for a spindle motor of a machine tool and fluctuation conditions for causing a rotation speed of the spindle motor to fluctuate, and generate a speed control command for controlling a speed of the spindle motor, based on the speed command and the fluctuation command; a speed deviation determination unit configured to determine whether or not a speed deviation that is based on the speed command and an actual speed of the spindle motor within a predetermined period of time is within a first permissible range; a torque command determination unit configured to determine whether or not a torque command for the spindle motor within a predetermined period of time is within a second permissible range; and a condition change unit configured to change the fluctuation conditions in a case where the speed deviation is outside the first permissible range and the torque command is outside the second permissible range.

Effects of the Invention

The present invention makes it possible to optimally adjust the fluctuation conditions and to achieve a stable effect of suppressing chatter.

PREFERRED MODE FOR CARRYING OUT THE INVENTION

Figure 1:
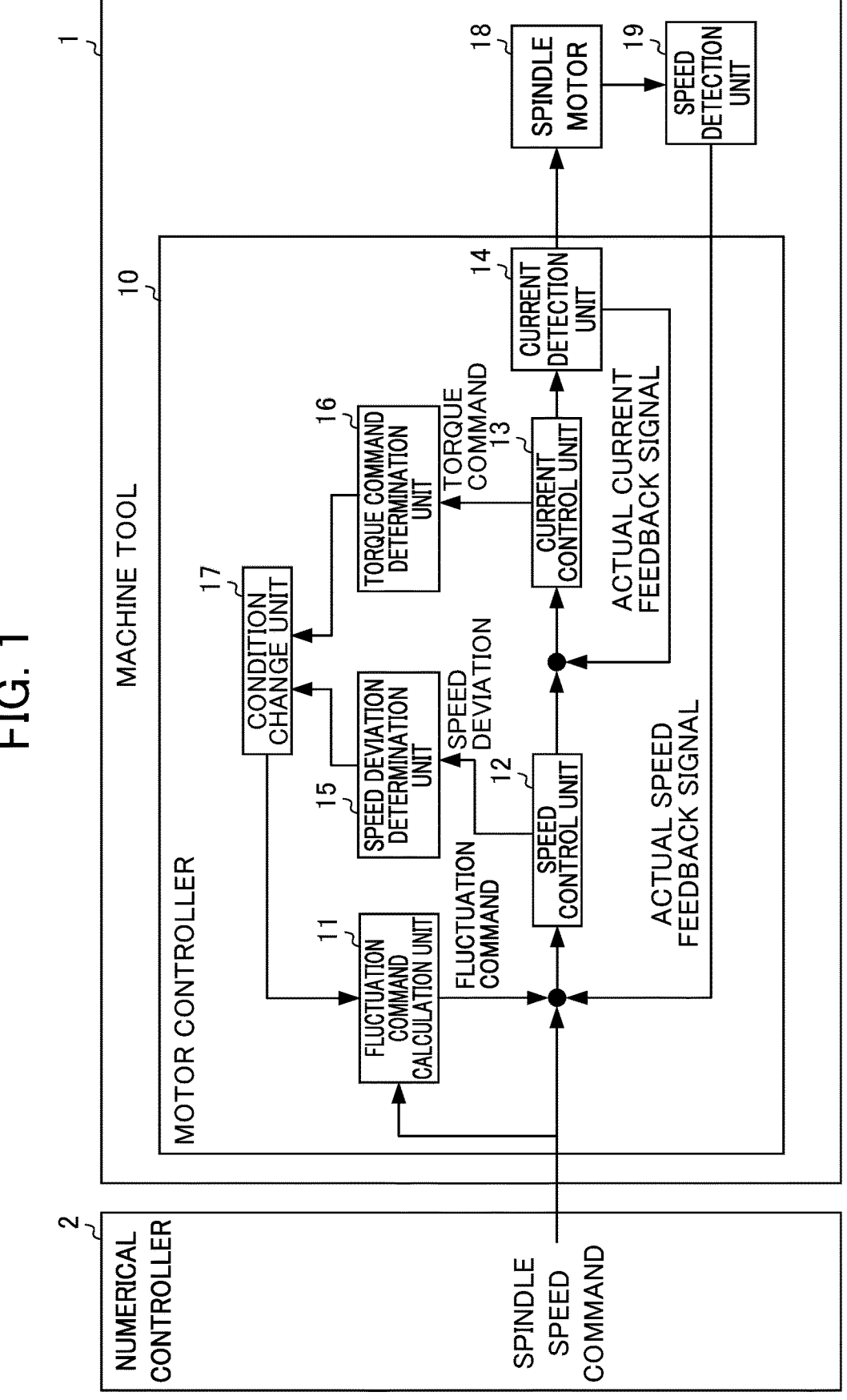
FIG. 1 is a diagram illustrating an outline of a machine tool according to an embodiment.

An example of embodiments of the present invention will be described below. FIG. 1 is a diagram illustrating an outline of a machine tool 1 according to the present embodiment. The machine tool 1 is an apparatus for performing predetermined machining, such as cutting, in accordance with control performed by a numerical controller 2.

The machine tool 1 includes a motor controller 10 for controlling a motor. The motor controller 10 includes a fluctuation command calculation unit 11, a speed control unit 12, a current control unit 13, a current detection unit 14, a speed deviation determination unit 15, a torque command determination unit 16, and a condition change unit 17.

The motor controller 10 is provided for the purpose of suppressing self-excited chatter vibration of regeneration type that occurs while the machine tool 1 is performing cutting. Here, chatter vibration refers to vibration that continuously occurs between a tool of the machine tool and a workpiece. The chatter vibration is roughly classified into forced chatter vibration and self-excited chatter vibration according to factors of the vibration.

The forced chatter vibration occurs under the influence of a forcible vibration source. On the other hand, the self-excited chatter vibration occurs without a specific vibration source, provided that a certain condition is satisfied due to a combination of a dynamic characteristic of the machine tool and a cutting process.

The self-excited chatter vibration includes self-excited chatter vibration of regeneration type, which is chatter vibration caused due to variation in thicknesses of chips. In order to suppress the self-excited chatter vibration of regeneration type, it is necessary to take measures to make chips have a constant thickness by adjusting a rotation speed of a tool.

There is a generally-known technique to suppress the self-excited chatter vibration of regeneration type that occurs during a cutting process performed by a machine tool, by causing a spindle speed of the machine tool to fluctuate cyclically.

In order to stably suppress the self-excited chatter vibration of regeneration type, it is necessary to appropriately adjust fluctuation conditions at the time of causing a speed of a spindle to fluctuate. However, setting the fluctuation conditions is complicated, thereby making it difficult to adjust the fluctuation conditions at a machining site. In respect of a spindle motor, factors of the self-excited chatter vibration of regeneration type include (1) insufficient torque for the spindle motor and (2) insufficient followability of the spindle motor.

In the case of the insufficient torque for the spindle motor, a torque command for the spindle motor is saturated, and an actual speed amplitude of the spindle motor decreases, whereby the chatter suppressing effect is unintentionally lowered, and the chatter vibration occurs.

The torque command for the spindle motor includes both a load torque (including inertia, a cutting load, etc.) of the spindle motor and an acceleration/deceleration torque generated due to speed fluctuation. For this reason, it is difficult for an operator of the machine tool to determine whether or not the torque command is saturated when the operator needs to adjust the fluctuation conditions at the time of causing a speed of the spindle motor to fluctuate.

In the case of the insufficient followability of the spindle motor, the spindle motor has insufficient frequency response and an actual speed amplitude of the spindle motor decreases, whereby the chatter suppressing effect is unintentionally lowered, and the chatter vibration occurs.

The frequency response of the spindle motor changes depending on a number of factors, such as the configuration of the machine tool (e.g., motor capability, control gain, load inertia, etc.). For this reason, it is difficult for an operator of the machine tool to determine whether or not the followability of the spindle motor is insufficient when the operator needs to adjust the fluctuation conditions at the time of causing a speed of the spindle motor to fluctuate.

The motor controller 10 according to the present embodiment effectively suppresses the above-described self-excited chatter vibration of regeneration type by performing the following control.

The fluctuation command calculation unit 11 calculates a fluctuation command, based on a speed command for a spindle motor 18 of the machine tool 1 and fluctuation conditions for causing a rotation speed of the spindle motor 18 to fluctuate. The fluctuation command calculation unit 11 then generates a speed control command, based on the speed command and the fluctuation command.

Specifically, the fluctuation command calculation unit 11 calculates the fluctuation command that includes the fluctuation conditions, based on the speed command and the fluctuation conditions for the spindle motor 18. Here, the fluctuation conditions include a fluctuation amplitude rate for causing an amplitude of the speed command to fluctuate, and a fluctuation frequency rate for causing a frequency of the speed command to fluctuate. The fluctuation conditions may be arbitrarily set as parameters by a user, or may be set in advance as predetermined values.

The fluctuation command calculation unit 11 superimposes the speed command on the calculated fluctuation command to thereby generate the speed control command for controlling a speed of the spindle motor 18. That is, the speed control command includes the speed command and the fluctuation command.

The speed control unit 12 calculates, based on a speed command outputted from the numerical controller 2 and an actual speed feedback signal of the spindle motor 18 outputted from a speed detection unit 19 (e.g., an encoder), a speed deviation indicating a difference between the speed command and the actual speed. The speed control unit 12 generates a torque command by performing proportional integration control (PI control) on the speed deviation, and outputs the torque command to the current control unit 13. Furthermore, the speed control unit 12 outputs the calculated speed deviation to the speed deviation determination unit 15.

The current control unit 13 generates a voltage command for driving the spindle motor 18, based on the torque command outputted from the speed control unit 12 and an actual current feedback signal outputted from the current detection unit 14, and outputs the voltage command to the spindle motor 18. Furthermore, the current control unit 13 outputs the torque command to the torque command determination unit 16.

The current detection unit 14 detects a current value of the spindle motor 18, and outputs the detected current value to the current control unit 13 as the actual current feedback signal.

The speed deviation determination unit 15 determines whether or not the speed deviation indicating the difference between the speed command and the actual speed of the spindle motor 18 within a predetermined period of time is within a first permissible range. Here, the predetermined period of time may be, for example, one fluctuation cycle for causing the rotation speed of the spindle motor 18 to fluctuate or a half of the fluctuation cycle. The speed deviation determination unit 15 monitors the speed deviation every one fluctuation cycle or every half fluctuation cycle, and determines whether or not the speed deviation is within the first permissible range.

In a case where the speed deviation is outside the first permissible range, the speed deviation determination unit 15 determines whether or not the speed deviation is greater than the first permissible range.

The torque command determination unit 16 determines whether or not the torque command for the spindle motor 18 within a predetermined period of time is within a second permissible range. Here, the predetermined period of time may be, for example, one fluctuation cycle for causing the rotation speed of the spindle motor 18 to fluctuate or a half of the fluctuation cycle. The torque command determination unit 16 monitors the torque command every one fluctuation cycle or every half fluctuation cycle, and determines whether or not the torque command is within the second permissible range.

In a case where the torque command is outside the second permissible range, the torque command determination unit 16 determines whether or not the torque command is greater than the second permissible range.

In the case where the speed deviation is outside the first permissible range, the condition change unit 17 changes the fluctuation conditions. Specifically, when the speed deviation is outside the first permissible range, the condition change unit 17 changes the fluctuation amplitude rate and/or the fluctuation frequency rate as the fluctuation conditions.

In a case where the speed deviation is greater than the first permissible range, the condition change unit 17 reduces the fluctuation amplitude rate and/or the fluctuation frequency rate. On the other hand, in a case where the speed deviation is less than the first permissible range, the condition change unit 17 increases the fluctuation amplitude rate and/or the fluctuation frequency rate.

Further, in the case where the torque command is outside the second permissible range, the condition change unit 17 changes the fluctuation conditions. Specifically, when the torque command is outside the second permissible range, the condition change unit 17 changes the fluctuation amplitude rate and/or the fluctuation frequency rate.

In a case where the torque command is greater than the second permissible range, the condition change unit 17 reduces the fluctuation amplitude rate and/or the fluctuation frequency rate. On the other hand, in a case where the torque command is less than the second permissible range, the condition change unit 17 increases the fluctuation amplitude rate and/or the fluctuation frequency rate.

Further, the condition change unit 17 may change the fluctuation conditions in a case where the speed deviation is outside the first permissible range and the torque command is outside the second permissible range.

Figure 2:
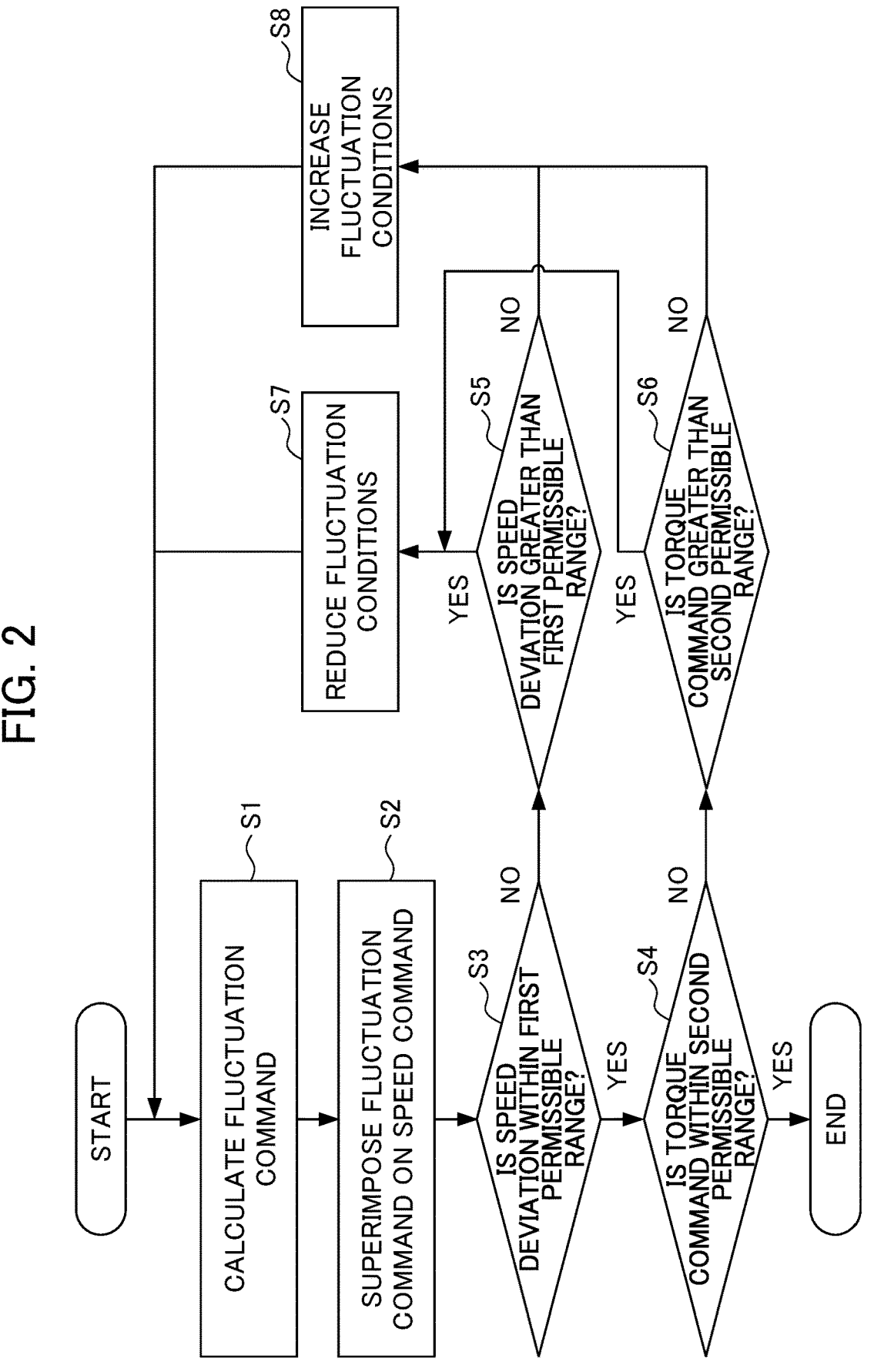
FIG. 2 is a flowchart illustrating a flow of a process performed by a motor control device according to an embodiment.

FIG. 2 is a flowchart illustrating a flow of a process performed by the motor controller 10 according to the present embodiment. In Step S1, the fluctuation command calculation unit 11 calculates the fluctuation command including the fluctuation conditions, based on the speed command and the fluctuation conditions for the spindle motor 18.

In Step S2, the fluctuation command calculation unit 11 superimposes the speed command on the fluctuation command calculated in Step S1 to thereby generate the speed control command for the spindle motor 18.

Figure 3:
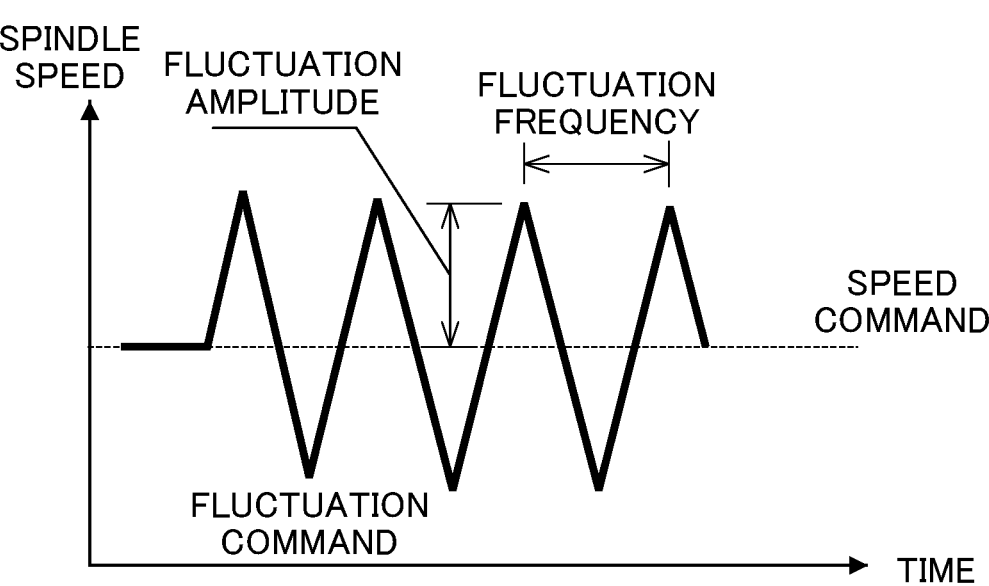
FIG. 3 is a graph illustrating examples of a speed command, a fluctuation command, and fluctuation conditions.

FIG. 3 is a graph illustrating examples of the speed command, the fluctuation command, and the fluctuation conditions. As illustrated in FIG. 3, the fluctuation command has a fluctuation amplitude and a fluctuation frequency, and is superimposed on the speed command. The fluctuation amplitude is calculated based on the speed command and the fluctuation amplitude rate, and the fluctuation frequency is calculated based on the speed command and the fluctuation frequency rate.

As illustrated also in FIG. 3, the fluctuation amplitude and the fluctuation frequency are calculated by the following formulas.

$$\text{Fluctuation Amplitude [min}-1] =$$

$$\text{Speed Command [min}-1] \times (\text{Fluctuation Amplitude Rate [\%]/100})$$

$$\text{Fluctuation Frequency [Hz]} =$$

$$(\text{Speed Command [min}-1]/60) \times (\text{Fluctuation Frequency Rate [\%]/100})$$

Although the fluctuation command in FIG. 3 has a triangular wave pattern, the fluctuation command is not limited thereto, and may have a pattern of, for example, a sine wave, a square wave, a rectangular wave, etc.

Referring back to FIG. 2, in Step S3, the speed deviation determination unit 15 monitors the speed deviation every one fluctuation cycle or every half fluctuation cycle, and determines whether or not the speed deviation is within the first permissible range. When the speed deviation is within the first permissible range (YES), the process proceeds to Step S4. On the other hand, when the speed deviation is outside the second permissible range (NO), the process proceeds to Step S5.

Figure 4:
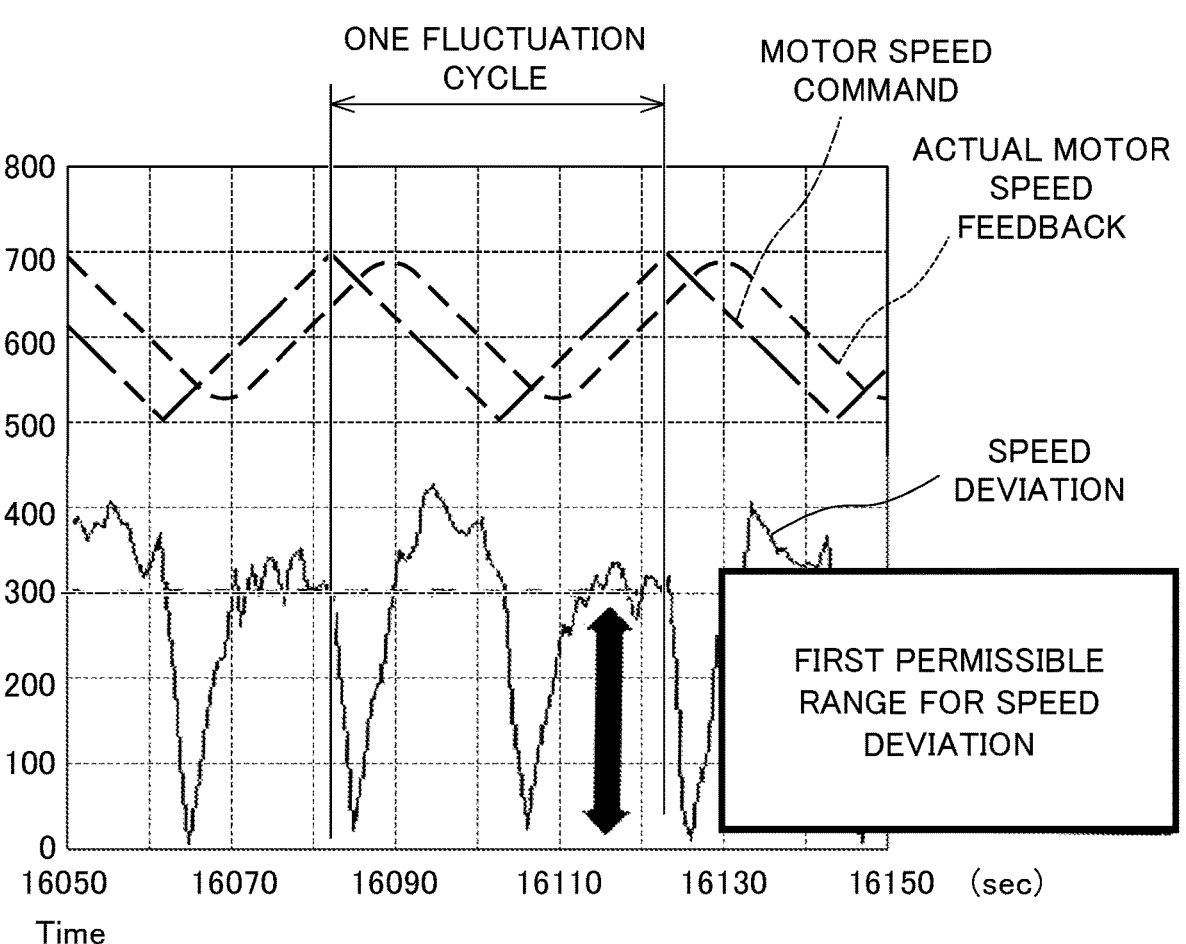
FIG. 4 is a graph illustrating examples of a speed deviation and a first permissible range.

FIG. 4 is a graph illustrating examples of the speed deviation and the first permissible range. In FIG. 4, the fluctuation cycle is calculated by taking the inverse of the fluctuation frequency of the fluctuation command. In the example shown in FIG. 4, the first permissible range is set to 0 min$^{-1}$ to 300 min$^{-1}$. The first permissible range may be arbitrarily set by the user, or a preset value may be used as the first permissible range. The first permissible range may be calculated based on a maximum rotation speed of the spindle motor 18 or a speed command from the numerical controller 2.

In the example shown in FIG. 4, the speed deviation determination unit 15 compares a maximum value of the speed deviation, which is an absolute value, with the first permissible range to thereby make a determination. However, this is a non-limiting example. For example, the speed deviation determination unit 15 may make a determination by comparing the first permissible range with an average of values of the speed deviation within a predetermined period of time.

Referring back to FIG. 2, in Step S4, the torque command determination unit 16 monitors the torque command every one fluctuation cycle or half fluctuation cycle, and determines whether or not the torque command is within the second permissible range. When the torque command is within the second permissible range (YES), the process ends. On the other hand, when the torque command is outside the second permissible range (NO), the process proceeds to Step S6.

Figure 5:
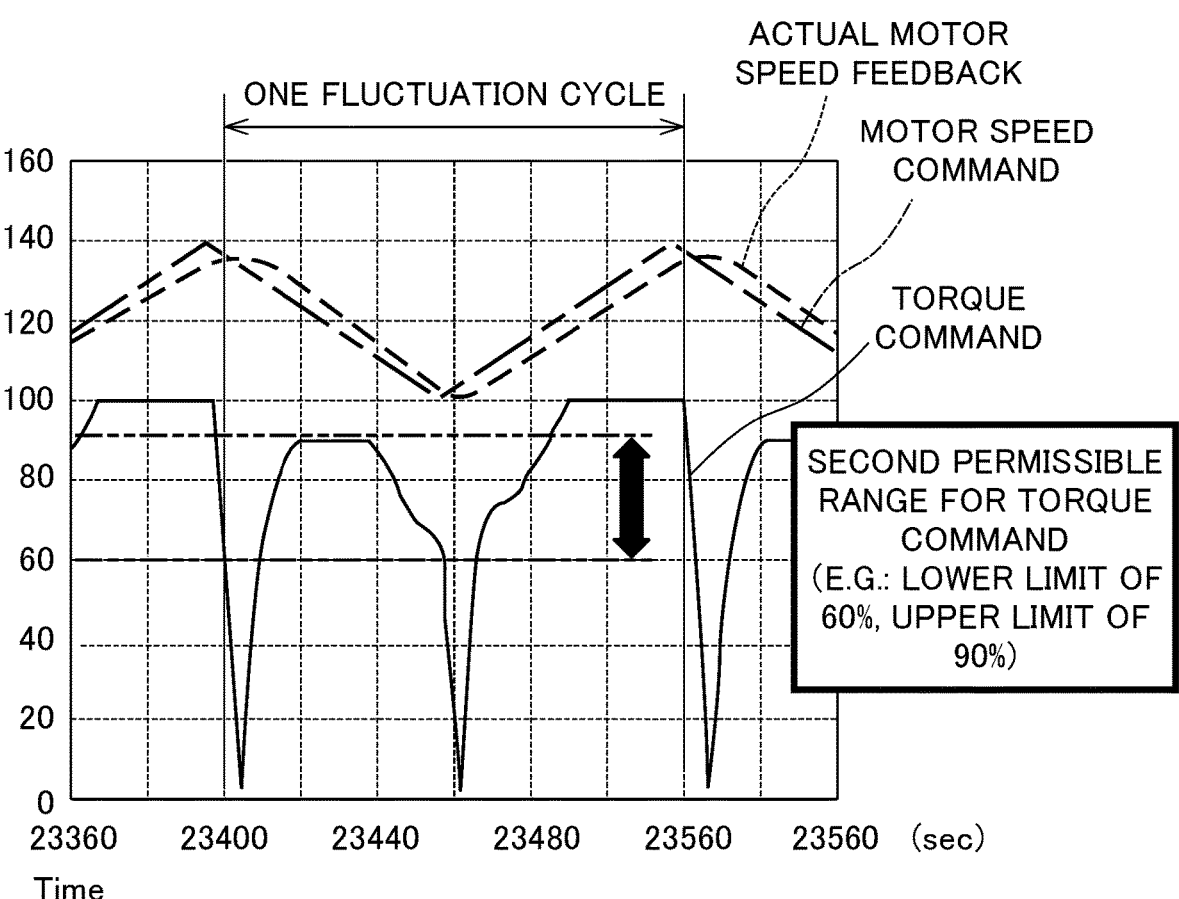
FIG. 5 is a graph illustrating examples of a torque command and a second permissible range.

FIG. 5 is a graph illustrating examples of the torque command and the second permissible range. In the example shown in FIG. 5, the second permissible range is set to 60% (lower limit) to 90% (upper limit) of the absolute value of the torque command. The second permissible range may be arbitrarily set by the user, or a preset value may be used as the second permissible range.

In the example shown in FIG. 5, the torque command determination unit 16 compares a maximum value of the torque command, which is an absolute value, with the second permissible range to make a determination. However, this is a non-limiting example. For example, the torque command determination unit 16 may make a determination by comparing the second permissible range with an average of values of the torque command within a predetermined period of time.

Referring back to FIG. 2, in Step S5, the speed deviation determination unit 15 determines whether or not the speed deviation is greater than the first permissible range. When the speed deviation is greater than the first permissible range (YES), the process proceeds to Step S7. When the speed deviation is not greater than the first permissible range (NO), the process proceeds to Step S8.

In Step S6, the torque command determination unit 16 determines whether or not the torque command is greater than the second permissible range. When the torque command is greater than the second permissible range (YES), the process proceeds to Step S7. When the torque command is not greater than the second permissible range (NO), the process proceeds to Step S8.

In Step S7, the condition change unit 17 reduces the fluctuation amplitude rate and/or the fluctuation frequency rate as the fluctuation conditions. In Step S8, the condition change unit 17 increases the fluctuation amplitude rate and/or the fluctuation frequency rate as the fluctuation conditions.

Here, in Steps S7 and S8, a multiplying factor for change of the fluctuation amplitude rate and/or the fluctuation frequency rate may be calculated based on a current multiplying factor for change, a maximum value of the speed deviation, and a maximum value of the speed deviation within the first permissible range, as indicated by the following formula.

$$
\begin{aligned}
\text{Multiplying Factor for Change} = \\
\text{(Current Multiplying Factor for Change)} + \\
\{\text{(Current Multiplying Factor for Change)} - \\
\text{(Maximum Value of Speed deviation)} / \text{(Maximum Value of Speed} \\
\text{Deviation within First Permissible Range)} \times \text{(Current multiplying factor)}\}
\end{aligned}
$$

A multiplying factor for change of the fluctuation amplitude rate and/or the fluctuation frequency rate may be calculated based on a current multiplying factor for change, a maximum value of the torque command, and a maximum value of the torque command within the second permissible range, as indicated by the following formula.

$$
\begin{aligned}
\text{Multiplying Factor for Change} = \\
\text{(Current Multiplying Factor for Change)} + \\
\{\text{(Current Multiplying Factor for Change)} - \\
\text{(Maximum Value of Torque Command)} / \\
\text{(Maximum Value of Torque Command within Second} \\
\text{Permissible Range)} \times \text{(Current Multiplying Factor for Change)}\}
\end{aligned}
$$

The multiplying factor for change of the fluctuation amplitude rate and/or the fluctuation frequency rate may be arbitrarily set as a parameter by the user, or a preset multiplying factor for change may be used. In the flowchart illustrated in FIG. 2, the processing of Step S4 is executed after the processing of Step S3, but instead, the processing of Step S3 may be executed after the processing of Step S4. In this case, the processing of Step S5 and the processing of Step S6 are switched with each other.

As described above, the motor controller 10 according to the present embodiment includes: the fluctuation command calculation unit 11 that calculates a fluctuation command, based on a speed command for the spindle motor 18 of the machine tool 1 and fluctuation conditions for causing a rotation speed of the spindle motor 18 to fluctuate, and generates a speed control command for controlling a speed of the spindle motor 18, based on the speed command and the fluctuation command; the speed deviation determination unit 15 that determines whether or not a speed deviation indicating a difference between the speed command and an actual speed of the spindle motor 18 within a predetermined period of time is within a first permissible range; and the condition change unit 17 that changes the fluctuation conditions when the speed deviation is outside the first permissible range.

Due to this feature, the motor controller 10 can change the fluctuation conditions in accordance with the speed deviation of the spindle motor 18. As a result, the motor controller 10 can optimally adjust the fluctuation conditions with respect to the followability of the spindle motor 18, and can provide a stable effect of suppressing chatter.

The fluctuation conditions include the fluctuation amplitude rate for causing the amplitude of the speed command to fluctuate and the fluctuation frequency rate for causing the frequency of the speed command to fluctuate. In the case where the speed deviation is outside the first permissible range, the condition change unit 17 changes the fluctuation amplitude rate and/or the fluctuation frequency rate. Due to this feature, the motor controller 10 can change the fluctuation amplitude rate and/or the fluctuation frequency rate in accordance with the speed deviation of the spindle motor 18. Thus, the motor controller 10 can appropriately adjust the fluctuation conditions.

In the case where the speed deviation is outside the first permissible range, the speed deviation determination unit 15 determines whether or not the speed deviation is greater than the first permissible range. When the speed deviation is greater than the first permissible range, the condition change unit 17 reduces the fluctuation amplitude rate and/or the fluctuation frequency rate. When the speed deviation is less than the first permissible range, the condition change unit 17 increases the fluctuation amplitude rate and/or the fluctuation frequency rate.

Due to this feature, the motor controller 10 can increase or reduce the fluctuation amplitude rate and/or the fluctuation frequency rate in accordance with the speed deviation of the spindle motor 18. Thus, the motor controller 10 can appropriately adjust the fluctuation conditions.

The motor controller 10 includes: the fluctuation command calculation unit 11 that calculates a fluctuation command, based on a speed command for the spindle motor 18 of the machine tool 1 and fluctuation conditions for causing a rotation speed of the spindle motor 18 to fluctuate, and generates a speed control command for controlling a speed of the spindle motor 18, based on the speed command and the fluctuation command; the torque command determination unit 16 that determines whether or not a torque command for the spindle motor 18 within a predetermined period of time is within a second permissible range; and the condition change unit 17 that changes the fluctuation conditions when the torque command is outside the second permissible range.

Due to this feature, the motor controller 10 can change the fluctuation conditions in accordance with the torque command for the spindle motor 18. As a result, the motor controller 10 can optimally adjust the fluctuation conditions with respect to a load and a torque margin of the spindle motor 18, and can provide a stable effect of suppressing chatter.

The fluctuation conditions include the fluctuation amplitude rate for causing the amplitude of the speed command to fluctuate and the fluctuation frequency rate for causing the frequency of the speed command to fluctuate. In the case where the torque command is outside the second permissible range, the condition change unit 17 changes the fluctuation amplitude rate and/or the fluctuation frequency rate.

Due to this feature, the motor controller 10 can change the fluctuation amplitude rate and/or the fluctuation frequency rate in accordance with the torque command for the spindle motor 18. Thus, the motor controller 10 can appropriately adjust the fluctuation conditions.

In the case where the torque command is outside the second permissible range, the torque command determination unit 16 determines whether or not the torque command is greater than the second permissible range. When the torque command is greater than the second permissible range, the condition change unit 17 reduces the fluctuation amplitude rate and/or the fluctuation frequency rate. When the torque command is less than the second permissible range, the condition change unit 17 increases the fluctuation amplitude rate and/or the fluctuation frequency rate.

Due to this feature, the motor controller 10 can increase or reduce the fluctuation amplitude rate and/or the fluctuation frequency rate in accordance with the torque command for the spindle motor 18. Thus, the motor controller 10 can appropriately adjust the fluctuation conditions.

The motor controller 10 includes: the fluctuation command calculation unit 11 that calculates a fluctuation command, based on a speed command for the spindle motor 18 of the machine tool 1 and fluctuation conditions for causing a rotation speed of the spindle motor 18 to fluctuate, and generates a speed control command for controlling a speed of the spindle motor 18, based on the speed command and the fluctuation command; the speed deviation determination unit 15 that determines whether or not a speed deviation that is based on the speed command and an actual speed of the spindle motor 18 within a predetermined period of time is within a first permissible range; the torque command determination unit 16 that determines whether or not a torque command for the spindle motor 18 within a predetermined period of time is within a second permissible range; and the condition change unit 17 that changes the fluctuation conditions when the speed deviation is outside the first permissible range and the torque command is outside the second permissible range.

Due to this feature, the motor controller 10 can change the fluctuation conditions in accordance with the speed deviation and the torque command of the spindle motor 18. Therefore, the motor controller 10 can optimally adjust the fluctuation conditions with respect to the followability of the spindle motor 18 and a load and a torque margin of the spindle motor 18, and can provide a stable effect of suppressing chatter.

While embodiments of the present invention have been described above, the motor controller 10 described above can be implemented by hardware, software, or a combination thereof. The control method performed by the motor controller 10 can also be implemented by hardware, software, or a combination of these. Here, the implementation by software means that a computer reads and executes a program for the implementation.

The program can be stored in various types of non-transitory computer readable media and can be provided to a computer. The non-transitory computer readable media include various types of tangible storage media. Examples of the non-transitory computer readable media include a magnetic recording medium (e.g., a hard disk drive), a magnetic-optical recording medium (e.g., a magnetic optical disk), a read only memory (CD-ROM), a CD-R, a CD-R/W, and a semiconductor memory (e.g., a mask ROM, a programmable ROM (PROM), an erasable PROM (EPROM), a flash ROM, and a random access memory (RAM)).

While the above-described embodiments are preferred embodiments of the present invention, the scope of the present invention is not limited to the above-described embodiments. Various modifications can be made without departing from the spirit of the present invention.

EXPLANATION OF REFERENCE NUMERALS

1: Machine tool
2: Numerical controller
10: Motor controller
11: Fluctuation command calculation unit
12: Speed control unit
13: Current control unit
14: Current detection unit
15: Speed deviation determination unit
16: Torque command determination unit
17: Condition change unit
18: Spindle motor
19: Speed detection unit

The invention claimed is:

1. A machine tool control device comprising:
a processor,
wherein the processor is configured to:
calculate a fluctuation command, based on a speed command for a spindle motor of a machine tool and fluctuation conditions for causing a rotation speed of the spindle motor to fluctuate, and generate a speed control command for controlling a speed of the spindle motor, based on the speed command and the fluctuation command;
determine whether or not a speed deviation indicating a difference between the speed command and an actual speed of the spindle motor within a predetermined period of time is within a first permissible range; and
change the fluctuation conditions in a case where the speed deviation is outside the first permissible range to suppress chatter vibration caused due to variation in thicknesses of chips during a cutting process performed by the machine tool,
wherein the first permissible range is calculated based on a maximum rotation speed of the spindle motor or the speed command from a numerical controller for controlling the machine tool,
wherein the fluctuation conditions include a fluctuation amplitude rate for causing an amplitude of the speed command to fluctuate and a fluctuation frequency rate for causing a frequency of the speed command to fluctuate, and
wherein a multiplying factor for change of the fluctuation amplitude rate and the fluctuation frequency rate is calculated based on a current multiplying factor for change, a maximum value of the speed deviation, and a maximum value of the speed deviation within the first permissible range.

2. The machine tool control device according to claim 1, wherein
in the case where the speed deviation is outside the first permissible range, the processor changes the fluctuation amplitude rate and/or the fluctuation frequency rate.

3. The machine tool control device according to claim 2, wherein
in the case where the speed deviation is outside the first permissible range, the processor determines whether or not the speed deviation is greater than the first permissible range,
when the speed deviation is greater than the first permissible range, the processor reduces the fluctuation amplitude rate and/or the fluctuation frequency rate, and when the speed deviation is less than the first permissible range, the processor increases the fluctuation amplitude rate and/or the fluctuation frequency rate.

4. A machine tool control device comprising:

a processor, wherein the processor is configured to:

calculate a fluctuation command, based on a speed command for a spindle motor of a machine tool and fluctuation conditions for causing a rotation speed of the spindle motor to fluctuate, and generate a speed control command for controlling a speed of the spindle motor, based on the speed command and the fluctuation command;

determine whether or not a torque command for the spindle motor within a predetermined period of time is within a second permissible range; and change the fluctuation conditions in a case where the torque command is outside the second permissible range to suppress chatter vibration caused due to variation in thicknesses of chips during a cutting process performed by the machine tool, wherein the second permissible range is set to 60% to 90% of an absolute value of the torque command, wherein the fluctuation conditions include a fluctuation amplitude rate for causing an amplitude of the speed command to fluctuate and a fluctuation frequency rate for causing a frequency of the speed command to fluctuate, and wherein a multiplying factor for change of the fluctuation amplitude rate and the fluctuation frequency rate is calculated based on a current multiplying factor for change, a maximum value of the torque command, and a maximum value of the torque command within the second permissible range.

5. The machine tool control device according to claim 4, wherein in the case where the torque command is outside the second permissible range, the processor changes the fluctuation amplitude rate and/or the fluctuation frequency rate.

6. The machine tool control device according to claim 5, wherein in the case where the torque command is outside the second permissible range, the processor determines whether or not the torque command is greater than the second permissible range, when the torque command is greater than the second permissible range, the processor reduces the fluctuation amplitude rate and/or the fluctuation frequency rate, and when the torque command is less than the second permissible range, the processor increases the fluctuation amplitude rate and/or the fluctuation frequency rate.

7. A machine tool control device comprising:

a processor, wherein the processor is configured to:

calculate a fluctuation command, based on a speed command for a spindle motor of a machine tool and fluctuation conditions for causing a rotation speed of the spindle motor to fluctuate, and generate a speed control command for controlling a speed of the spindle motor, based on the speed command and the fluctuation command;

determine whether or not a speed deviation that is based on the speed command and an actual speed of the spindle motor within a predetermined period of time is within a first permissible range;

determine whether or not a torque command for the spindle motor within a predetermined period of time is within a second permissible range; and change the fluctuation conditions in a case where the speed deviation is outside the first permissible range and the torque command is outside the second permissible range to suppress chatter vibration caused due to variation in thicknesses of chips during a cutting process performed by the machine tool, wherein the first permissible range is calculated based on a maximum rotation speed of the spindle motor or the speed command from a numerical controller for controlling the machine tool, wherein the second permissible range is set to 60% to 90% of an absolute value of the torque command, wherein the fluctuation conditions include a fluctuation amplitude rate for causing an amplitude of the speed command to fluctuate and a fluctuation frequency rate for causing a frequency of the speed command to fluctuate, and wherein a multiplying factor for change of the fluctuation amplitude rate and the fluctuation frequency rate is calculated based on a current multiplying factor for change, a maximum value of the speed deviation, and a maximum value of the speed deviation within the first permissible range, or calculated based on a current multiplying factor for change, a maximum value of the torque command, and a maximum value of the torque command within the second permissible range.

* * * * *